United States Patent
Gosselin et al.

(10) Patent No.: US 8,160,555 B2
(45) Date of Patent: *Apr. 17, 2012

(54) SYSTEM AND METHOD FOR DETERMINATION OF NETWORK AND CONDITIONAL EXECUTION OF APPLICATIONS AND PROMOTIONS

(75) Inventors: Mark Gosselin, Seattle, WA (US); Rick Hennessey, Bainbridge Island, WA (US)

(73) Assignee: Cequint, Inc., Seattle, WA (US)

( * ) Notice: Subject to any disclaimer, the term of this patent is extended or adjusted under 35 U.S.C. 154(b) by 440 days.

This patent is subject to a terminal disclaimer.

(21) Appl. No.: 12/422,927

(22) Filed: Apr. 13, 2009

(65) Prior Publication Data

US 2010/0261460 A1 Oct. 14, 2010

(51) Int. Cl.
*H04M 3/42* (2006.01)
*H04W 4/00* (2009.01)

(52) U.S. Cl. .................................. 455/414.1; 455/466

(58) Field of Classification Search .............. 455/412.2, 455/414.1, 414.2, 415, 418, 432.1, 433, 458, 455/550.1, 466; 370/335, 342
See application file for complete search history.

(56) References Cited

U.S. PATENT DOCUMENTS

| | | | |
|---|---|---|---|
| 4,894,861 A | 1/1990 | Fujioka | |
| 4,924,496 A | 5/1990 | Figa et al. | |
| 5,210,789 A | 5/1993 | Jeffus et al. | |
| 5,220,599 A | 6/1993 | Sasano et al. | |
| 5,265,145 A | 11/1993 | Lim | |
| 5,446,785 A | 8/1995 | Hirai | |
| 5,490,205 A | 2/1996 | Kondo et al. | |
| 5,506,894 A | 4/1996 | Billings et al. | |
| 5,506,895 A | 4/1996 | Hirai et al. | |
| 5,546,447 A | 8/1996 | Skarbo et al. | |
| 5,727,057 A | 3/1998 | Emery et al. | |
| 5,734,706 A | 3/1998 | Windsor et al. | |
| 5,754,636 A | 5/1998 | Bayless et al. | |
| 5,771,283 A | 6/1998 | Chang et al. | |
| 5,867,562 A | 2/1999 | Scherer | |
| 5,982,867 A | 11/1999 | Urban et al. | |

(Continued)

FOREIGN PATENT DOCUMENTS

EP 0876038 11/1998

(Continued)

OTHER PUBLICATIONS

"The Case for Wireless Calling Name Delivery Service," VeriSign White Paper; pp. 9, Sep. 2007.

*Primary Examiner* — Melody Mehrpour
(74) *Attorney, Agent, or Firm* — Lowe Graham Jones PLLC

(57) ABSTRACT

System and method for determining whether an incoming call originates from inside or outside of a mobile carriers network. An example system performs a GTT (global title translation) on an incoming number to determine the hosting carrier of any mobile phone number. After the result of the matching determination is made, a message is generated and sent to a caller associated with the call page. The generated message includes any of directory information associated with the subscriber, information associated with cost savings or comparisons associated with in-network calling, information regarding promotions for calling plans, mobile devices or device upgrades, requests to join a network, requests to join a social call plan, information regarding instant savings or call rebates, offers for online services or software, offers for reduced cost or free phone service in exchange for adoption of a predefined product or entering into a social network group.

19 Claims, 2 Drawing Sheets

U.S. PATENT DOCUMENTS

| | | |
|---|---|---|
| 6,005,927 A | 12/1999 | Rahrer et al. |
| 6,075,850 A | 6/2000 | Ali et al. |
| 6,353,664 B1 | 3/2002 | Cannon et al. |
| 6,366,670 B1 | 4/2002 | Davis et al. |
| 6,449,351 B1 | 9/2002 | Moss et al. |
| 6,714,639 B1 | 3/2004 | Bedingfield et al. |
| 6,813,344 B1 | 11/2004 | Lemke |
| 6,985,572 B2 | 1/2006 | Gosselin |
| 7,088,994 B2 | 8/2006 | Uhlmann |
| 7,149,517 B2 | 12/2006 | Easley |
| 7,170,984 B2 | 1/2007 | Gosselin |
| 7,170,985 B2 | 1/2007 | Gosselin |
| 7,200,212 B2 | 4/2007 | Gosselin |
| 7,966,026 B2 * | 6/2011 | Zellner et al. ............... 455/457 |
| 2002/0159574 A1 | 10/2002 | Stogel |
| 2003/0041030 A1 | 2/2003 | Mansfield |
| 2003/0063730 A1 | 4/2003 | Woodring |
| 2004/0066920 A1 | 4/2004 | Vandermeijden |
| 2004/0242212 A1 | 12/2004 | Bacon et al. |
| 2005/0215250 A1 * | 9/2005 | Chava et al. ............... 455/433 |
| 2006/0234703 A1 * | 10/2006 | Wuthnow et al. ............ 455/433 |
| 2007/0121806 A1 * | 5/2007 | Bedingfield ............... 379/67.1 |
| 2007/0127656 A1 | 6/2007 | Citron et al. |
| 2007/0230680 A1 * | 10/2007 | McCann ................. 379/221.13 |
| 2008/0059642 A1 | 3/2008 | Bhogal et al. |
| 2008/0240383 A1 | 10/2008 | Fronczak et al. |
| 2008/0305792 A1 * | 12/2008 | Khetawat et al. .......... 455/435.1 |
| 2009/0061860 A1 * | 3/2009 | Jiang ......................... 455/433 |
| 2009/0323636 A1 * | 12/2009 | Dillon et al. ................. 370/331 |
| 2011/0045825 A1 * | 2/2011 | Schwalb ................... 455/426.1 |

FOREIGN PATENT DOCUMENTS

| | | |
|---|---|---|
| EP | 0920169 | 6/1999 |
| JP | 4086144 | 3/1992 |
| JP | 4248739 | 9/1992 |
| JP | 09064960 | 3/1997 |
| JP | 9321856 | 12/1997 |
| JP | 10276257 | 10/1998 |
| JP | 2002044221 | 2/2002 |
| JP | 2002305602 | 10/2002 |
| JP | 2005198218 | 7/2005 |
| WO | 9717793 | 5/1997 |
| WO | 2006024952 | 3/2006 |
| WO | 2007056577 | 5/2007 |
| WO | 2008122052 | 10/2008 |

* cited by examiner

SYSTEM AND METHOD FOR DETERMINATION OF NETWORK AND CONDITIONAL EXECUTION OF APPLICATIONS AND PROMOTIONS

BACKGROUND OF THE INVENTION

Some mobile phone calling plans include reduced charges (i.e., free or minimal charge of monthly account time or allocated "minutes") when an incoming call comes from a caller that belongs to the same mobile network as the call recipient. Such promotional features make calls between subscriber mobile phones free of charge, for registered mobile handsets. Other plans permit subscribers to share minutes with other subscribers, when the mobile subscriber plans are obtained or linked together for billing purposes. The importance of identifying in-network calls is thus highlighted, as subscribers may avoid charges altogether if they can distinguish in-network calls from out-of-network calls, and the carrier can inform non-network callers of its free in-network calling feature, if such a feature were available.

Another approach to mobile telephony price promotion is the in-circle plan, such as a calling circle plan. Such plans allow subscribers to specify certain numbers that are called frequently from the subscriber's handset (the numbers comprise the subscriber's "circle"), and provides a discount on calls made "in-circle." Identifying the appropriate billing rate involves the carrier storing those numbers for each subscriber and checking a database at the time of call to apply promotional rates. An "in-circle" calling plan is not a general check of in-network calls, however, it is just a preferential billing promotion applied to a handful of frequently called numbers.

Other plans also allow subscribers to identify and preset caller "favorites," such as a set of frequently called numbers, which can include both in- and out-of network numbers, on a carrier's promotional billing plans. This type of reduced-cost calling is not an in-network notification, as it may include numbers outside of the carrier's network. Other proposals for discounted billing to frequently called numbers might.

Other proposals for discounted billing to frequently called numbers might apply lower billing rates for the most frequently called numbers each billing cycle, for all numbers called over a certain pre-set number of minutes each billing cycle, and so forth.

A few methods have previously been proposed for alerting the call recipient if the call source shares the same network. For example, a network-based Global Title Translation (GTT) query will identify the carrier associated with the Caller Identification (CDN) or Mobile Directory Number (MDN) to the Network Control Point (NCP) of the caller's mobile carrier. A GTT search is typically requested at a Signaling Transfer Point (STP) associated with the NCP, while the incoming call page is held pending the result of the query. Once the result is given, the call page with the information is released to the sender. While this permits the connection of the call and appropriate billing for an in-network call by the carrier, there is a cost associated with the GTT search by the carrier, and there is no display indicator of the in-network call to the call recipient indicating whether or not the call is in-network.

Another approach is set forth in US Patent Application Publication No. 2008/0059642 (IBM). This approach also requires a network-based determination of the carrier of the calling and the called party by the network carrier, and provision of the in-network notification to both the calling and the called parties. Three methods are recited, one, similar to GTT, requires a network database query by the caller's carrier, prior to call termination. This has the accuracy limitation, since mobile numbers are portable, and when callers switch networks this method introduces errors. The second method, performed after call termination, looks at the switching information for the caller and the called number, which is highly accurate. With this method, however, the data that the call is in-network is only determined after the call has been established and further requires that the in-network determination be incorporated into the established call via either a side channel or mixed into the digital signal itself. The third method, performed while the called party's phone is on, but not on a call, requires the phone to have a side data channel. This requires the phone, at startup, to contact the network to do database lookup to see if the phone numbers in the address book are in-network. This method is limited to updating the 'in-network' status only of the phone numbers stored in the caller directory on the called party's handset, however. As a result, this method does not ensure that new callers and their numbers are identified as "in-network," which is the situation in which caller identification is the most helpful to the called party.

Considering the shortcomings of the aforementioned methods, it is clear that there is a need for a method for allowing mobile device users to determine whether their calls are "in-network" and thus potentially subject to certain cost-saving promotions or rate reductions offered by service providers, or to the display of enhanced information regarding the calling party. Therefore, an improved system and method for automatically notifying subscribers of the "in-network" status of calls is highly desirable.

SUMMARY OF THE INVENTION

The present invention provides an example system that performs a GTT (global title translation) on an incoming number to determine the hosting carrier of any mobile phone number. After the result of the matching determination is made, a message is generated and sent to a caller associated with the call page. The generated message includes any of directory information associated with the subscriber, information associated with cost savings or comparisons associated with in-network calling, information regarding promotions for calling plans, mobile devices or device upgrades, requests to join a network, requests to join a social call plan, information regarding instant savings or call rebates, offers for online services or software, offers for reduced cost or free phone service in exchange for adoption of a predefined product or entering into a social network group.

These and other examples of the invention will be described in further detail below.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
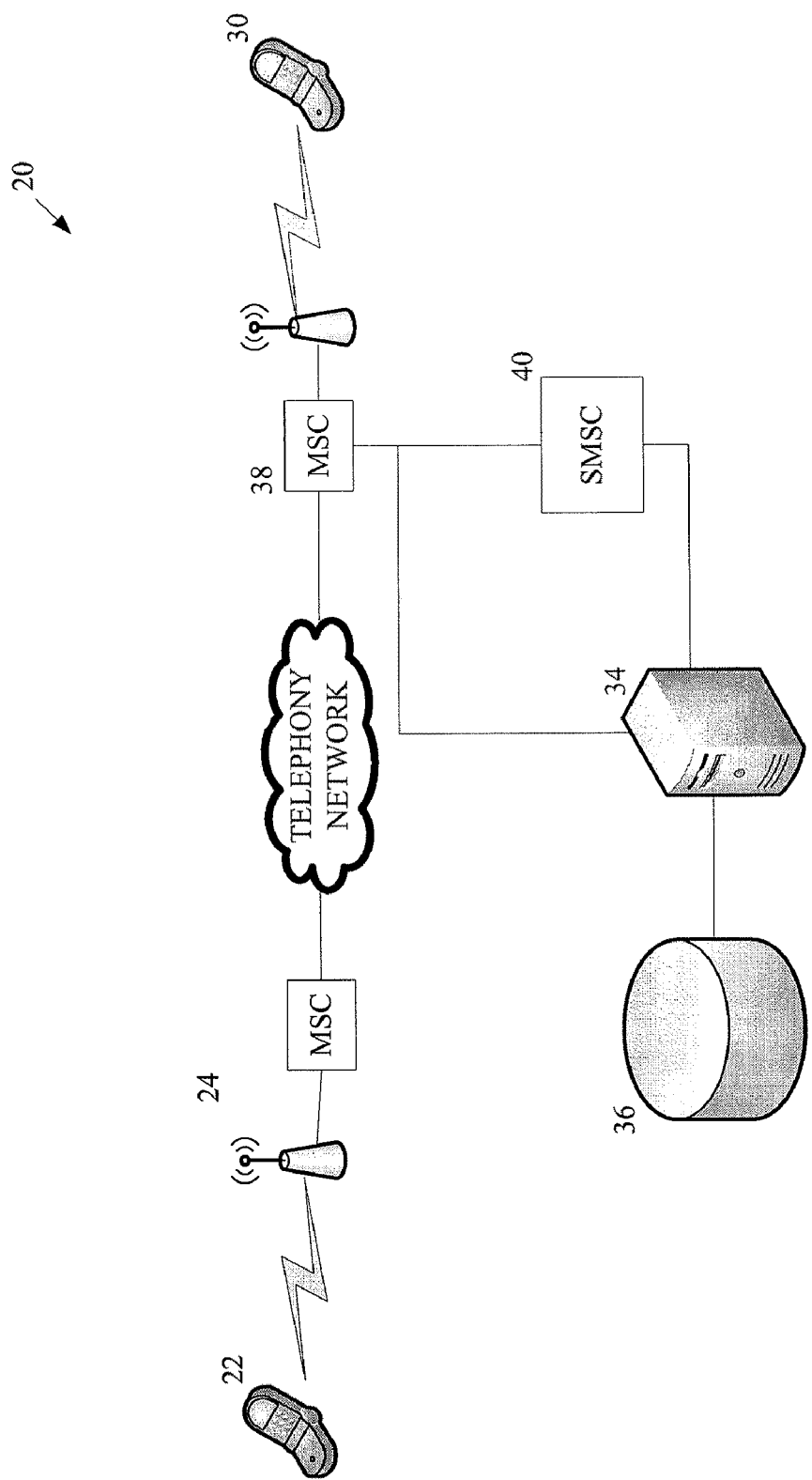
FIG. 1 is a diagram of an example system formed in accordance with an embodiment of the present invention.

FIG. 1 shows a system 20 that performs a GTT (global title translation) on an incoming number to determine the hosting carrier of any mobile phone number. If the result matches the subscriber's carrier, a terminating mobile device (TM) 30 indicates to the subscriber that the call is an "in network call." The indication may be selected from one or more from the set of visual (e.g., logo, text, picture), audible (signal/tone, spoken notification) or haptic notifications. The words "in network," "network," the name of the carrier, such as "Sprint," a logo of the carrier, or an image indicating the source of the call are displayed to the call recipient. A specific ring tone, audio signal, audio message, or recorded message is audibly outputted to the subscriber.

The in-network notification permits the subscriber to identify calls "in network," which are often of less cost, or free of charge, to answer. Also, the subscriber can identify friends and associates who are "out of network," and arrange the time and means of communication with them to save cost. This may be arranged automatically sending an SMS message to the caller, rather than picking up the call, if that is a less expensive or more convenient means. This may also be done silently.

The invention also permits the subscriber and/or the subscriber's carrier to promote the migration of "out of network" callers to the subscriber's carrier.

In one embodiment, after the call page generated by an originating mobile device (OM) 22 via an originating carrier system 24 is received on the TM 30, the TM 30 contacts a server 34 associated with a Mobile Switching Center (MSC) 38 associated with the TM 30. The server 34 performs a GTT and returns the result of the GTT back to the TM 30 for indication. If OM 22 is "in-network" with TM 30, then an "in-network" indicator is given. If OM 22 is not "in-network" with TM 30, then an "out of network" indication is given, and optionally a courtesy message is sent to the caller on the OM 22, such as a message indicating and/or scheduling the optimal time for a return call. The result is also stored on the TM 30 for future use with repeat incoming calls and can be refreshed by a variety of methods (i.e. time, usage frequency, open connection). The indications may be sent with the incoming call page, or made before releasing the call page at the MSC 38 to connect the call. If sent before releasing the call page at the MSC 38, the indication may be sent via SMS or other data channel delivery to the TM 30 and the OM 22, separate from and in advance of, the terminated call. Similar subject matter is discussed in co-pending application Ser. No. 12/349,679 filed Jan. 7, 2009, which is hereby incorporated by reference.

Depending on the carrier's network technology, if it is not possible to open a data channel to the server 34 to perform the GTT after a voice call page has been made to the TM 30, the GTT is performed at the network level prior to the call page being sent to the TM 30. Then, the result of the GTT may be sent to the TM 30 prior to the call page, using port-directed (as with Java applications) or application-directed (as with BREW application IDs) short message service (SMS) via a Short Message Service Center (SMSC) 40, or is included with other data (such as CNAM name identification data) in the call page. After the TM 30 receives the SMS, the GTT results are outputted to the subscriber of the TM 30.

In another embodiment, when none of the above facilities are available, a table lookup may be performed locally on the TM 30. A caller's number is examined by client software such as City ID® from Cequint, Inc. on the TM 30. A database stored on the TM 30 contains codes to match the digits in the caller identification information (CID) from the incoming call in the form NPA-NXX-XXXX to the local exchange codes (in the form NXX) for specific mobile carriers. For example, in a given area code NPA, local exchange NXX 302 may be assigned to Verizon, 301 to Sprint, etc.

In this embodiment, to ensure a correct indication of carrier, the TM 30 checks for exceptions to the NXX coding because of local number portability. A caller can change from their original mobile carrier to a different network and retain their original number, whether to another mobile carrier or to a landline telephony provider. This produces exceptions to the match of the NXX code and the carrier assigned that NXX, thus making matching less than 100% accurate. To overcome this, TM 30 may check the full phone number against an exception list (e.g., a database of Local Numbers Ported (LNPs)) to see if it has been ported from the original carrier to another local carrier. The check with the exception list is done after determination of the assigned carrier using NXX coding. Thus, the "in network" indication would not be determined on a matching NXX code alone, but in this embodiment after confirmation that the number is not in an LNP directory.

Note that the LNP exceptions are of two kinds, LNP into the carrier, where the carrier hosts a number that does not match its assigned NXX codes. This gives a false negative on the NXX check, and the number has to be confirmed as "in network" by reference to the LNP data. Conversely, LNP out of the carrier yields a false positive on the NXX match on a number that has been ported to another carrier, and this number has to be confirmed as "out of network" by reference to the LNP data. The database of LNP exceptions can be stored on the TM 30 for reference and comparison, and updated over the network; or it can be stored on the carrier's network and checked via a query sent over the mobile device's data channel or via SMS messaging when one of these facilities is available without conflict of the network voice page. While both methods are technically feasible, the cost of updating the LNP database, their storage requirements, and privacy concerns would inform the actual deployment decision.

Network Determination of "In Network" Result

The determination respecting the "in-network" indication can be performed on the network before the call is terminated to the subscriber's TM 30, also known as "pre-call." This is preferably done via a query to identify the carrier associated with the CID. The query is made to a data service such as the CNAM service operated by AT&T DG, typically called a GTT query. In another embodiment, this is done by making a direct query to a carrier's subscriber database 36, e.g., the customer database at Verizon, typically called a Telephone Number Index/TNI query. These databases provide the accuracy to confirm or correct the carrier's NXX match on the CID as they are regularly updated with LNP information by the carriers. LNP changes can be queried against a database on the network, as well. When the information is obtained from these queries, it is sent to the TM 30 with other data in the call page, via SMS, or other data facility. One example of sending the query results with the call page would be to utilize the traditional CNAM facility containing the CID and display text field with name, by inserting a visible character like "*," a "0" or "1," or by using a hidden ASCII character before the text string containing the caller's name. Detection of this special character would indicate to the subscriber's TM 30 to deliver an "in-network" notification with the incoming call information. In this example, software is included so that the carrier's OEM call handler software strips the special characters (such as the "*," "0" or "1") before displaying the caller identification text, to ensure the correct display of the caller information. The system preferably would not strip hidden ASCII characters.

Delivery of the "In Network" Result Via the SMS Channel

In another embodiment, the determination respecting the "in-network" indication is performed during the incoming call via a data query on a separate SMS message channel, with the result delivered via SMS, during the incoming call, to the TM 30, known as in-call notification. In such a network deployment, a query is made by a software product on the TM 30, such as NameID™ from Cequint, Inc., which queries the database 36 to determine which carrier is associated with the number, and displays resulting caller identification information on the display of the TM 30 along with the incoming CID. The process includes making a GTT query via such client software on the TM 30, in order to confirm or correct the NXX comparison made on the CID, to provide an accurate "in-network" query result. As with the prior methods, an LPN query can be made against a database on the network or on the TM 30, for changes and correction of the in-network result. Unlike prior methods, this is not limited by the time permitted before the call is answered on the MT; an in-network notification done with this embodiment may be given after the call is answered.

Client software on the TM 30 uses a data channel to send information over the mobile carrier's data network MSC 38. An SMS message can also be used to return the in-network and LNP query results to the TM 30. In one embodiment, this is done using SMS or data channel GSM (as these networking systems permit simultaneous voice and data channel traffic to the mobile device). On CDMA networks, SMS or the data channel may be operational, but not in parallel with voice calling, which requires that the data be delivered prior to the call, or updated in the caller directory post-call, for use on subsequent calls. Typically, the result is the receipt of an 'in-network' notification during the ring sequence of an incoming call, in concert with the display of the CID by the OEM call handler software on the TM 30. It is valuable to determine the carrier associated with an MDN on the handset, when the network is unavailable due to roaming, voice call activity (CDMA networks), poor coverage, and so forth. The error rate associated with LNP is approximated at one percent in and one percent out of the networks, and although accepting such errors in all cases would not be acceptable to carriers or handset manufacturers, a 99% accuracy rate with local handset determination of the carrier associated with an MDN is sufficient for making preliminary entries in the contact database on the handset. Thus, the present invention permits preliminary entries using handset-based determination of the carrier network associated with the calling party's MDN, which is subsequently updated via network-based LNP checks. This improves the user experience of caller identification using carrier "in-network" notification by ensuring that the information is available for any phone number, and not just when the network data services are connected. Also, notably, the small percentage of LNP errors are actually opportunities for conversion of the owner of the listed MDN to the carrier network, advertising both the benefits of in-network calling and informing the use that proper network and caller identification relies on the LNP—rather than the network's own identification database; this allows a "Don't Be Lost—Join In"—themed marketing message to support the marketing campaign to switch callers to the calling party's carrier. This indicates the benefit of doing a local query on the handset to determine carrier associated with an MDN, even though more accurate information may be returned from an LNP check from a network query at a later time. These benefits result uniquely from combining both local handset query and network-based query to make in-network determinations described in the present invention.

Refreshing "In Network" Information in the Caller Directory

At times, delay in the delivery of the "in-network" notification will occur after call completion because of delay or latency in the communications networks, or caller behavior such as an immediate pickup of an incoming call by the subscriber. However, an "in-network" indication received after the incoming call is answered and/or terminated can be stored in a database or traditional caller directory on the TM 30 for later reference, known as post-call. The next time the number is received, the indication of "in-network" displays along with other information stored in the caller directory. As with other records provided by the network query, this information can be confirmed and refreshed from time to time by software on the TM 30, such as Name ID™. Preferably using a FIFO (first in first out) method, newer caller identification records (including CID, caller name, city/state or other geolocation information, and "in-network" notification) are retained and older records deleted. This forces the "in-network" indication to be analyzed anew for callers who have not called the mobile device in some time. Similarly, records can be refreshed by making queries during any incoming call; or on a periodic basis (e.g., for any caller who has not phoned the mobile device in the past 30 days).

Figure 2:
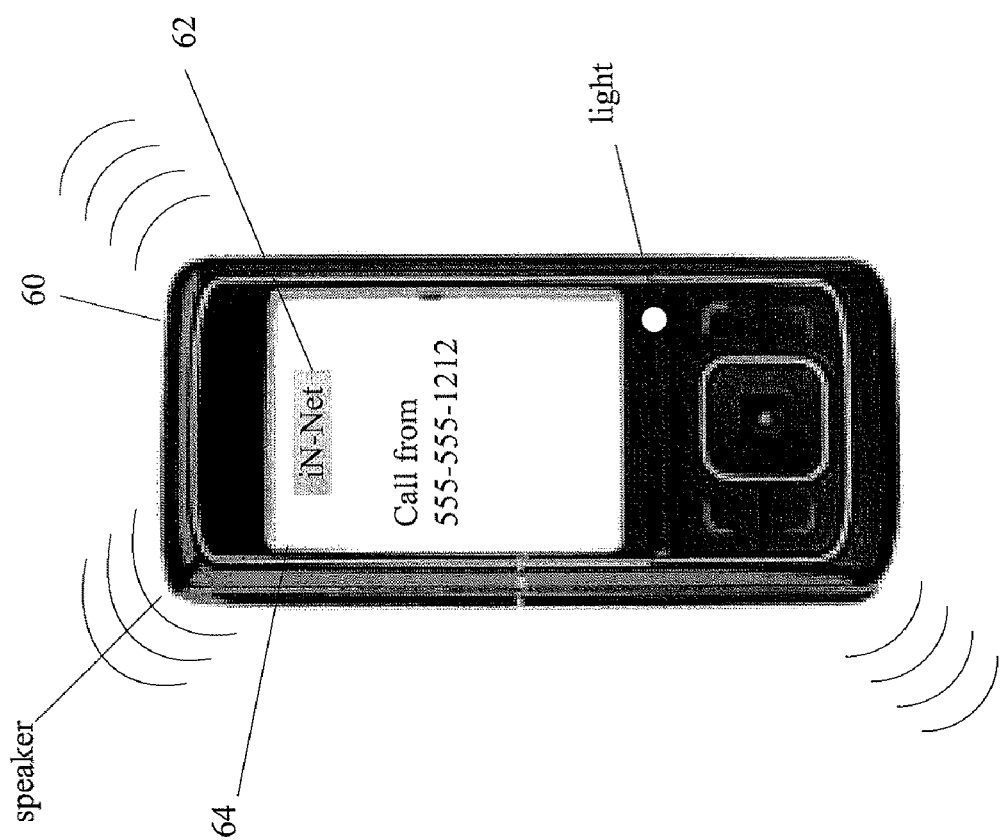
FIG. 2 is an image of a mobile device configured to alert a user of in-network and/or out-of-network calls.

FIG. 2 shows an example mobile device 60 that is receiving a call from another in-network subscriber as determined by one of the methods described above. An abbreviated "in-network" indicator 62 is displayed prominently on a display 64 of the mobile device 60.

Triggering Adoption Campaigns

This display may conclude the operation of the software, or may act as a trigger condition or input for commencement of other applications, messages and/or promotions, for the benefit of the user of the mobile device 60 or the out-of-network caller. U.S. patent application Ser. No. 12/191,904, filed Aug. 14, 2008 is hereby incorporated by reference. Specific notification or adoption messages, or software-driven campaigns, could also be triggered and targeted to an out-of-network caller, following the receipt of the initial call. SMS and out of network messages could be generated by the carrier during and/or after the incoming call to send adoption or migration messages to the caller (at no charge to the subscriber). Such messages could include, without limitation, call directory information on the called party, cost savings or comparisons associated with in-network calling, promotions for calling plans and mobile devices or device upgrades, requests to join a network, requests to join a subscriber's circle or other social call plan, instant savings or call rebates, offers for online services or software, offers of reduced cost or free phone service for adoption of other products or entering into social network groups, and the like. The offers could be presented in text only, text and graphics, or contain web links, dialog buttons, or other actionable content to solicit responses from the recipient at the OM 22.

Determining and Displaying Landline or Mobile Designation of Caller on the Mobile Handset Display In an alternative embodiment, the present invention inspects the NPA/NXX codes provided by a CID for an incoming calls to determine whether the incoming call is being made from a landline or a mobile handset. Once the determination is made, the number is preferably placed into the correct field in the mobile handset caller directory. Thereafter, the OEM software layer call handler software automatically displays the inbound number in the display, for example, using the graphic icons from the user interface in the mobile handset caller directory associated with the type of line to indicate land or mobile.

A further advantage of this embodiment is that it enables the present invention to verify, correct or replace the categorization of landline or mobile associated with the phone number in the mobile handset caller directory, for example, the mischaracterization resulting from data entry error by the user or default to the first field in the directory. In alternative embodiments, the present invention may automatically override the entry with the correction or may inform the user and request permission to make the correction to the entry.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method comprising:
   receiving a call page at a mobile switching center;
   sending the call page to a mobile device associated with the subscriber receiving the call page;
   determining at the mobile switching center if a mobile communications network associated with the call page matches a mobile communications network of the subscriber receiving the call page;
   sending the determined results to the mobile device associated with the subscriber receiving the call page; and
   processing the sent results at the mobile device of the subscriber.

2. The method of claim 1, wherein if the sent results are received at the mobile device prior to termination of a call event associated with the call page, outputting the sent results at the mobile device of the subscriber.

3. The method of claim 2, wherein the sent determined results are sent in a short message service (SMS) message, wherein outputting the sent results comprises outputting an indication of "in network" communication on the mobile device if a match is determined based on the SMS message.

4. The method of claim 2, wherein the outputted result comprises one or more of a visual indication, a haptic indication or an audio indication.

5. The method of claim 1, wherein if the sent results are received at the mobile device after termination of a call event associated with the call page, storing the sent results at the mobile device of the subscriber.

6. The method of claim 1, wherein determining if a mobile communications network associated with a call page matches a mobile communications network of a subscriber receiving the call page comprises performing a global title translation (GTT) at the mobile switching center before the call page is sent to the mobile device of the subscriber.

7. The method of claim 1, wherein sending the determined results to a mobile device associated with the subscriber receiving the call page comprises sending an SMS message that includes the result of the determination via a data channel.

8. The method of claim 1, wherein determining at a mobile switching center if a mobile communications network associated with a call page matches a mobile communications network of a subscriber receiving the call page comprises:
   receiving the call page at the mobile device;
   sending a communication to a server associated with the mobile service center associated with the mobile device;
   performing a GTT at the server based on the sent communication; and
   sending the result of the performed GTT to the mobile device.

9. The method of claim 8, further comprising storing the received result of the performed GTT in memory of the mobile device.

10. The method of claim 1, further comprising determining at a mobile switching center if the call page is being made from a landline or a mobile handset.

11. The method of claim 10, wherein determining at a mobile switching center if the call page is being made from a landline or a mobile handset comprises inspecting the NPA/NXX codes provided by caller identification information.

12. The method of claim 11, further comprising:
   determining at the mobile device if the call page has been properly characterized as being from a landline or a mobile handset; and
   if the call page has not been properly characterized, correcting the characterization of the call page at the mobile device as originating from a landline or mobile handset.

13. The method of claim 12, wherein correcting the characterization of the call page as originating from a landline or mobile handset comprises overriding the original characterization at the mobile device.

14. The method of claim 12, wherein correcting the characterization of the call page as originating from a landline or mobile handset comprises notifying the subscriber the of the mischaracterization and requesting permission to correct the mischaracterization.

15. The method of claim 1, further comprising if the mobile communications network associated with the call page does not match the mobile communications network of the subscriber, automatically generating a message and sending the generated message to a caller associated with the call page.

16. The method of claim 15, wherein the generated message comprises one or more of directory information associated with the subscriber, information associated with at least one of cost savings or comparisons associated with in-network calling, information regarding promotions for at least one of calling plans, mobile devices or device upgrades, requests to join a network, requests to join a social call plan, information regarding one of instant savings or call rebates, offers for one of online services or software, offers for one of reduced cost or free phone service in exchange for at least one of adoption of a predefined product or entering into a social network group.

17. The method of claim 16, further comprising presenting information included in the sent message.

18. The method of claim 16, wherein presenting comprises displaying at least one of text or graphics.

19. The method of claim 16, wherein presenting comprises displaying a web link.

* * * * *